June 14, 1966 G. C. DEWEY ETAL 3,256,491

CIRCUIT FOR SIMULTANEOUSLY COUPLING AN R.F. SIGNAL TO A PLURALITY OF ANTENNAS

Filed May 10, 1963 2 Sheets-Sheet 1

INVENTORS
GORDON C. DEWEY
NORMAN STURM
GEORGE C. LICENCE
JULIUS R. INSLER
BY Nolte & Nolte
ATTORNEYS June 14, 1966 G. C. DEWEY ETAL 3,256,491
CIRCUIT FOR SIMULTANEOUSLY COUPLING AN R.F. SIGNAL
TO A PLURALITY OF ANTENNAS
Filed May 10, 1963 2 Sheets-Sheet 2

INVENTORS
GORDON C. DEWEY
NORMAN STURM
GEORGE C. LICENCE
JULIUS R. INSLER
BY
Nolte & Nolte
ATTORNEYS United States Patent Office 3,256,491

Patented June 14, 1966

3,256,491

CIRCUIT FOR SIMULTANEOUSLY COUPLING AN R.F. SIGNAL TO A PLURALITY OF ANTENNAS

Gordon C. Dewey, New York, Norman Sturm, Mount Vernon, George C. Licence, Brooklyn, and Julius R. Insler, Bronx, N.Y., assignors to The G. C. Dewey Corporation, New York, N.Y., a corporation of New York Filed May 10, 1963, Ser. No. 279,529

1 Claim. (Cl. 330—22)

This invention relates to coupling circuits. More particularly, this invention relates to a multicoupler circuit for simultaneously coupling an R.F. input to a plurality of antennas.

There are several important facets in designing an antenna coupler which will meet specified limitations. Correct impedance matching at the input of the amplifier is desired while simultaneously achieving a low amplifier noise figure. The several outputs must possess a high degree of isolation from each other, and at the same time the phase difference between any two outputs must be small. The amplitude-frequency response of the antenna coupler must be substantially uniform over a given frequency range (e.g. 2.0 mc. to 32 mc.) consistent with minimum intermodulation of signals.

Accordingly, the main object of this invention is to provide a multicoupler including all of the above features.

Another object is to provide an improved antenna coupling system.

Still another object is to provide an improved multicoupler circuit utilizing semiconductors.

The manner in which the above objects are accomplished will be explained in detail below with reference to the drawing, wherein.

Figures 1A, 2:
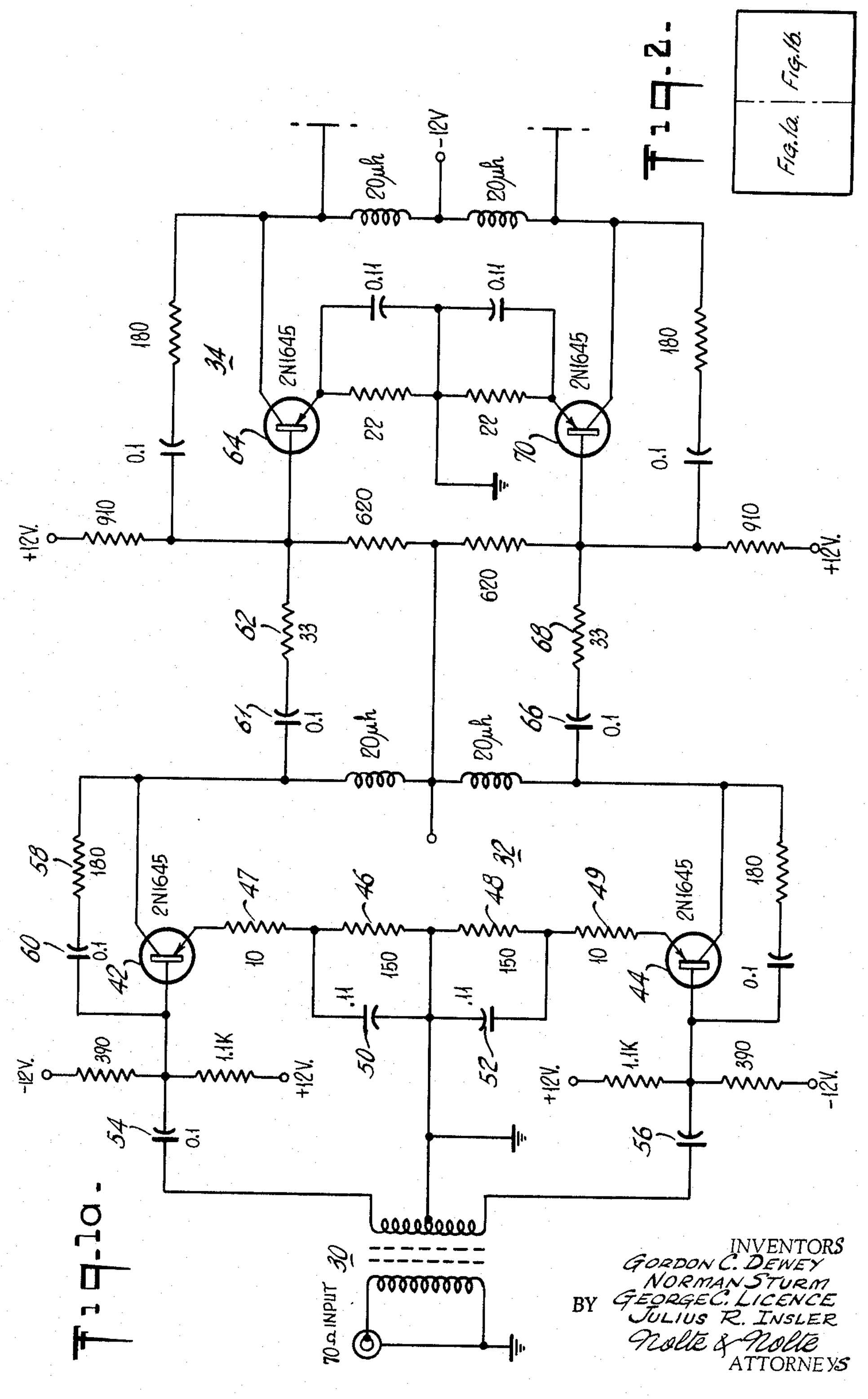
FIGURES 1A and1B illustrate a schematic circuit according to the invention.
FIGURE 2 illustrates the manner in which FIGURES 1A and 1B go together.
Figure 1B:
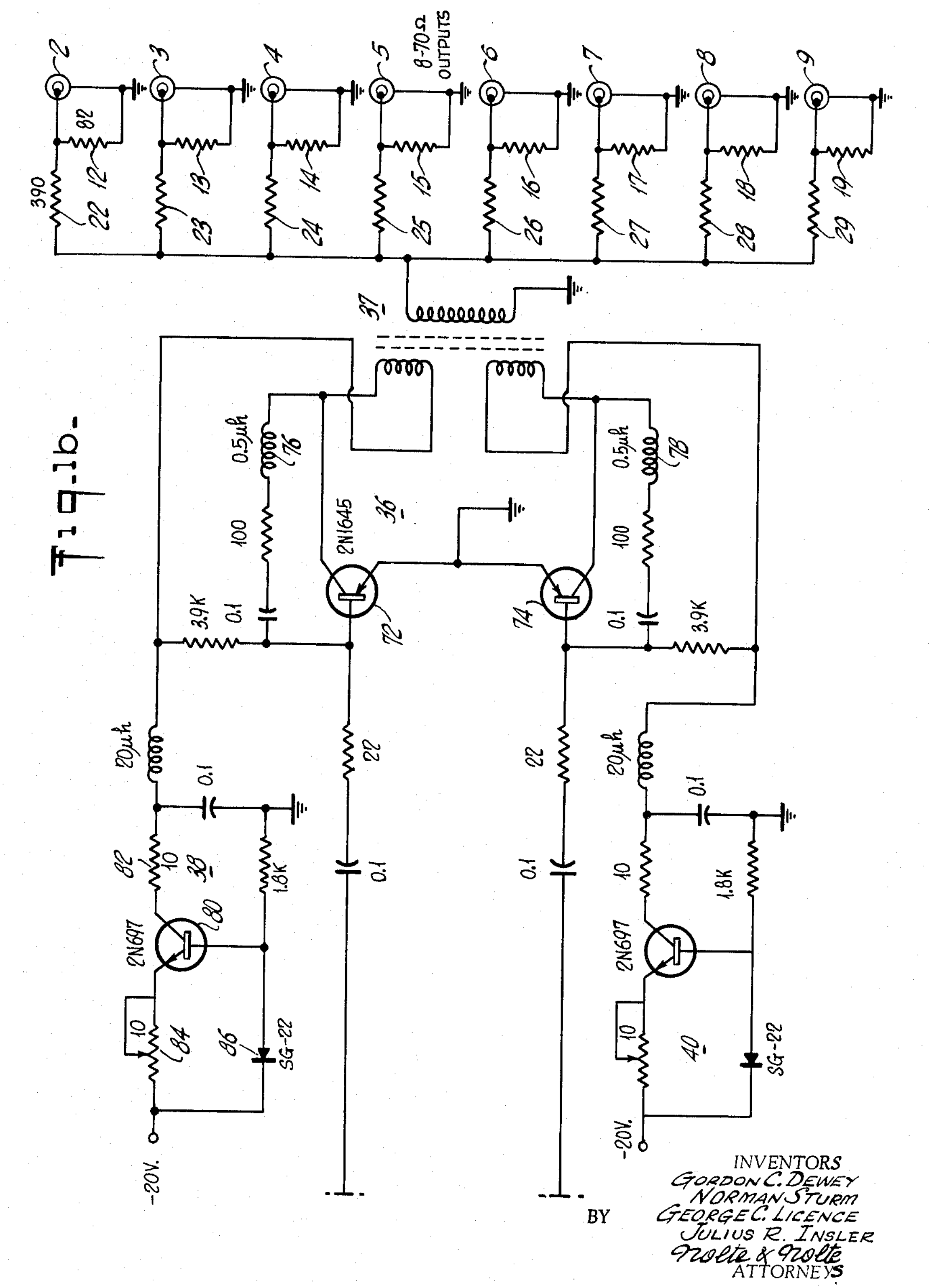

In the circuit diagram, the vertical numbers adjacent the resistors and capacitors indicate their values in ohms and microfarads, respectively. The invention is shown for use with eight 70 ohm antennas 2–9, having respective resistors 12–19 connected thereacross and resistors 22–29 connected in series with the secondary of the output transformer.

The antenna may be considered an ideal voltage source in series with a 70 ohm resistor, and is terminated by the input impedance of the first stage of the amplifier. Because of the feedback connection, the amplifier input impedance is of the order of 70 ohms. From the point of view of establishing a stable, resistive input from the antenna, this arrangement is of significant value.

A parallel arrangement of output terminations is employed to serve two purposes. First, since all the outputs are connected to a common point through series resistors, the relative phase of any two output signals is determined primarily by the relative similarity of these resistors. The necessary degree of similarity is readily obtained, and this method of minimizing phase difference is simpler and more economcal than the hybrid output arrangement now used in vacuum-tube equipment. Second, isolation between any two outputs in the amount of 45 db or better is provided. This is accomplished through a reduction of the combined impedance of the output network with the feedback in the amplifier, and the isolation network. With the adoption of the parallel output arrangement, it is desirable to maintain the termination of the individual outputs with a 70 ohm resistor to provide sufficient loading of the output transistor. This purpose would, for example, be served by a make-before-break type of connector.

The possibility exists of capitalizing on improved transistors, as they become available, if this amplifier system is implemented. An increase in the amount of feedback attainable would permit paralleling more outputs with the same degree of isolation and achieving a greater reduction in distortion, or would permit obtaining increased gain.

The input signal is applied to input coupling and impedance matching transformer 30, whose secondary is coupled to the first of three push-pull amplifier stages 32, 34 and 36. The output of the last amplifier stage 36 is coupled to an output transformer 37. A pair of constant current sources 38 and 40 are coupled to respective sides of the last amplifier stage 36. As will be explained below, the constant current sources, by regulating the current flow in each side of the output stage, serve the important function of maintaining the intermodulation distortion constant.

The various amplifier stages are fundamentally identical. The first stage 32 consists of a pair of transistors 42 and 44 whose emitters are coupled through biasing resistors 46 and 48, respectively, to the grounded center tap of the secondary of input transformer 30. Capacitors 50 and 52 are connected across the resistors 46 and 48, respectively, to by-pass the RF signal to ground. As illustrated, each side of the first amplifier stage may include additional resistors 47 and 49 in series with the emitter. The signals from the secondary of transformer 30 are coupled through blocking capacitors 54 and 56 to the bases of transistors 42 and 44, respectively. Each transistor has a feedback circuit including a resistor 58 to limit the amount of feedback, and a capacitor 60 to block the D.C. signal. Amplifier stage 32 is a low current amplifier in order to keep the noise level as low as possible.

The collector of transistor 42 is coupled through D.C. blocking capacitor 60 and resistor 62 to the base of one transistor 64 of amplifier 34. Similarly, the collector of transistor 44 is coupled through capacitor 66 and resistor 68 to the base of a second transistor 70. As shown, amplifier 34 is identical to first stage 32 except for the change in the biasing resistors.

The outputs of second stage 34 are also RC coupled to the inputs of third stage 36 which consists of transistors 72 and 74 having their emitters connected to ground. Because the high current in the last stage decreases the gain at high frequencies, the feedback circuits of transistors 72 and 74 includes a compensating inductance 76 and 78 in series with the respective resistors and capacitors to increase the amplifier gain at high frequencies.

A properly designed feedback amplifier inherently possesses good gain stability, is relatively insensitive to variations in component values and power-supply changes, and enables realizing low signal distortion. However, in this particular application an amplifier can be designed so that the optimum noise figure of a transistor is more nearly approached than can be done in the case of a distributed amplifier. The plural output connections are taken from a low-impedance point where the shunt-feedback connection is made. Thus, an important advantage of this type of amplifier in this essentially unity-gain application is the inclusion of the terminating resistance in the feedback arrangement. This means that the noise power associated with the terminating resistance is reduced by the amount of feedback provided in the amplifier.

With regard to terminations, it is possible to obtain a 70 ohm termination at the input without any substantial dependence on the input characteristics of the transistor amplifier. The several output terminations can be provided using resistors, a design feature which makes the problem of obtaining small phase differences between outputs susceptible to easy solution. The output impedance of the feedback amplifier can be made sufficiently low to achieve, in conjunction with a network, the desired degree of isolation of the individual outputs from each other.

A feedback amplifier design does require the use of transistors possessing a high gain-bandwidth product to realize a uniform amplifier response in the frequency range of 2.0 mc. to 32 mc. Transistors which are adequate in this respect are commercially available presently.

As mentioned above, a constant current source 38 maintains the current in each output stage at a constant level. Since constant current sources 38 and 40 are identical, the operation of only source 38 will be described. Source 38 includes a transistor 80 having a resistor 82 connected in the collector circuit in series with a primary winding of output transformer 37. A negative bias is applied to the emitter of transistor 80 through a variable resistor 84. Diode 86 is connected in the base-emitter circuit to set the voltage at the base of the transistor. The operation of the constant current source is such that when transistor 72 of amplifier 36 draws excessive current, the voltage drop across the base-emitter junction of transistor 80 decreases to prevent excessive current flow in the output stage. Similarly, when the current through transistor 72 tends to decrease, the negative voltage across the emitter-base junction of transistor 80 increases, to draw additional current and maintain the output current at a constant level.

The output or secondary of transformer 37 is coupled in parallel to all eight 70 ohm antennas 2–9, through resistors 22–29. Resistors 22–29 in conjunction with respective resistors 12–19 provide isolation between the various outputs.

In a preferred embodiment, all of the transistors used were power transistors since the current swing of such transistors is small relative to the capability thereof, and therefore the response is linear.

To carry out a detailed design of the transistor feedback amplifier, care must be exercised in the layout of components, choice of components, and interconnections to achieve low stray capacitance, stability and low noise figure. Also, the choice of base-circuit biasing resistors for the first stage must be made such that their parallel combination has a large value to attain the best possible noise figure. Such a precaution is consistent with realizing the maximum gain capability of the first transistor. Improvement in performance of the amplifier will be obtained with transistors which possess higher gain-bandwidth products. Shaping of the amplifier gain characteristic will aid in the rejection of signals outside the pass band and may be expected to improve the performance of the amplifier within the pass band. However, attempts to obtain improvements by this means may be expected to meet with difficulty. It is noted that the gain-bandwidth products of the transistors, in the long run, limit the amount of feedback obtainable in an amplifier having a 32 mc. bandwidth. This fact directly affects the distortion characteristics of the amplifier.

The illustrated circuit is capable of providing performance as follows:

Noise figure: 6.5–7 db
Isolation between outputs: better than 45 db (max. 60 db)
Intermodulation products: down 47 db
Power consumption to supply 8 loads: 10 watts
Maximum interfering signal that will not reduce small signal gain: 2.0 v. r.m.s.
Operating frequency range: essentially flat, 2–32 mc.

Performance with respect to intermodulation distortion is excellent through using a push-pull arrangement in the amplifier. Assuming the input impedance can be allowed to vary slightly, an arrangement using a transformer to match the antenna to the input transistor circuit gives improvement in noise figure.

Although a specific embodiment of the invention has been described, the invention should not be limited except as defined in the following claim.

We claim:

A multi-coupler for simultaneously coupling a radio frequency signal to a plurality of relatively low resistance outputs comprising; a plurality of amplifier stages in cascade connection with one another, each stage including at least one transistor, an output transformer coupled to the output stage of the last of said amplifier stages, the secondary of said output transformer being coupled in parallel to each of said outputs, a resistor connected in series at each of said outputs and a resistor connected across each of said outputs to provide isolation of said outputs from each other, and a constant current source in the last amplifier stage comprising a transistor connected in the collector circuit of at least one of the transistors in the last amplifier stage, a variable resistance in the emitter circuit of said constant current transistor and a diode between the base and emitter of said constant current transistor so that a constant current level is provided in said last amplifier stage to maintain a constant intermodulation distortion.

References Cited by the Examiner

UNITED STATES PATENTS

| | | | |
|---|---|---|---|
| 2,186,195 | 1/1940 | Dalpayrat | 330—109 X |
| 2,292,136 | 8/1942 | Lindsay | 330—109 X |
| 3,091,739 | 5/1963 | Smith-Vaniz | 330—28 X |

FOREIGN PATENTS

| | | |
|---|---|---|
| 109,530 | 1/1940 | Australia. |

ROY LAKE, *Primary Examiner.*

F. D. PARIS, *Assistant Examiner.*